US011135777B2

(12) United States Patent
Luo et al.

(10) Patent No.: US 11,135,777 B2
(45) Date of Patent: Oct. 5, 2021

(54) POYLMERIC COMPOSITION FOR USE AS A TEMPORARY SUPPORT MATERIAL IN EXTRUSION BASED ADDITIVE MANUFACTURING

(71) Applicants: Xiaofan Luo, Shanghai (CN); Zhaokun Pei, Weifang (CN); Haiqing Yin, Changzhou (CN)

(72) Inventors: Xiaofan Luo, Shanghai (CN); Zhaokun Pei, Weifang (CN); Haiqing Yin, Changzhou (CN)

(73) Assignee: JF POLYMERS (SUZHOU) CO. LTD., Changshu (CN)

( * ) Notice: Subject to any disclaimer, the term of this patent is extended or adjusted under 35 U.S.C. 154(b) by 0 days.

(21) Appl. No.: 16/709,364

(22) Filed: Dec. 10, 2019

(65) Prior Publication Data

US 2020/0131364 A1   Apr. 30, 2020

Related U.S. Application Data

(62) Division of application No. 14/848,526, filed on Sep. 9, 2015, now abandoned.

(60) Provisional application No. 62/047,723, filed on Sep. 9, 2014.

(51) Int. Cl.

| | |
|---|---|
| *B29C 64/40* | (2017.01) |
| *C08L 75/04* | (2006.01) |
| *B33Y 70/00* | (2020.01) |
| *B33Y 10/00* | (2015.01) |
| *B29K 67/00* | (2006.01) |
| *B29K 75/00* | (2006.01) |
| *D01F 6/94* | (2006.01) |
| *D01F 6/92* | (2006.01) |
| *B29C 64/118* | (2017.01) |

(52) U.S. Cl.
CPC .......... *B29C 64/40* (2017.08); *B33Y 70/00* (2014.12); *C08L 75/04* (2013.01); *B29C 64/118* (2017.08); *B29K 2067/046* (2013.01); *B29K 2075/00* (2013.01); *B29K 2995/006* (2013.01); *B33Y 10/00* (2014.12); *C08L 2207/04* (2013.01); *D01F 6/92* (2013.01); *D01F 6/94* (2013.01)

(58) Field of Classification Search
CPC ...... C08L 75/04; C08L 2207/04; B29C 64/40; B29C 64/106; B33Y 70/00; B33Y 10/00; D01F 6/94; D01F 6/92; B29K 2067/046; B29K 2075/00; B29K 2995/006; D10B 2331/041; D10B 2331/10
See application file for complete search history.

(56) References Cited

U.S. PATENT DOCUMENTS

| | | | |
|---|---|---|---|
| 5,121,329 A | 6/1992 | Crump | |
| 7,754,807 B2 | 7/2010 | Priedman, Jr. et al. | |
| 2011/0306719 A1 | 12/2011 | Hilmer | |
| 2015/0291791 A1 | 10/2015 | Makal | |
| 2016/0185050 A1* | 6/2016 | Topolkaraev | B29C 64/321 |
| | | | 264/308 |
| 2016/0332767 A1 | 11/2016 | Chivrac | |
| 2017/0313998 A1 | 11/2017 | Alvarez | |
| 2018/0291532 A1 | 10/2018 | Terada | |

OTHER PUBLICATIONS

Jaso et al.; Journal of Applied Polymer Science, 2014, vol. 131, issue 22, article 41104, p. 1-8.*
Smooth-On; Shore Hardness Scales, 2019, p. 1.*
Feng, F. et al.; Journal of Applied Polymer Science, 2011, vol. 119, p. 2778-2783.
Futak, E., et al.; Effect of Metal Organic Framework Concentration on the Crystallization of PLA-Al-MOF Composites, 2016, p. 1-34.
Corre, Y.M. et al.; Rhelogica Acta, 2011, p. 613-629.
Mi, H.Y., et al.; Materials Science and Engineering C. 2013, vol. 3, p. 4767-4776.
Sarikhani K. et al.; Polymer, 2016 vol. 98, P. 100-109.
Lai, S..M. et al.; Journal of Polymer Research, 2013, vol. 20, Issue 6, Article 140, p. 1-8.

* cited by examiner

*Primary Examiner* — Robert S Jones, Jr.
(74) *Attorney, Agent, or Firm* — Alvin T. Rockhill

(57) ABSTRACT

The polymeric composition of this invention can be used as a temporary support material in the additive manufacturing of three dimensional articles without compromising the quality of the ultimate product, reducing printing speed, increasing cost, increasing the incidence of printer jamming, or requiring printers of increased complexity. This invention more specifically discloses a polymeric composition which is particularly useful as a temporary support material for utilization in three-dimensional printing, said polymeric composition being comprised of a first polymeric component which is suitable for use as a modeling material and a second polymeric component which is immiscible with the first polymeric component, wherein the polymeric composition has a continuous phase, wherein the continuous phase is comprised of the second polymeric component, and wherein the polymeric composition has a Shore A hardness of at least 80.

20 Claims, 4 Drawing Sheets

3 different interfaces

Support - model interface    Model - model interface    Support - support interface

POYLMERIC COMPOSITION FOR USE AS A TEMPORARY SUPPORT MATERIAL IN EXTRUSION BASED ADDITIVE MANUFACTURING This is a divisional of U.S. patent application Ser. No. 14/848,526, filed on Sep. 9, 2015, which claims the benefit of U.S. Provisional Patent Application Ser. No. 62/047,723, filed on Sep. 9, 2014. The teachings of U.S. patent application Ser. No. 14/848,526 and U.S. Provisional Patent Application Ser. No. 62/047,723 are incorporated herein by reference in their entirety.

BACKGROUND OF THE INVENTION

By definition, "rapid prototyping" is a group of techniques that can be used to quickly fabricate a scale model of a physical part or assembly using 3-dimensional computer aided design (CAD) data. In rapid prototyping, construction of the part or assembly is usually done in an additive, layer-by-layer fashion. Those techniques that involve fabricating parts or assemblies in an additive or layer-by-layer fashion are termed "additive manufacturing" (AM), as opposed to traditional manufacturing methods which are mostly reductive in nature. Additive manufacturing is commonly referred to by the general public as "3D printing".

According to ASTM Committee F42 on Additive Manufacturing Technologies, there are currently seven basic AM technologies: material extrusion, material jetting, binder jetting, vat photopolymerization, sheet lamination, powder bed fusion and directed energy deposition. The most widely used of these seven AM technologies is based on material extrusion. While some variations exist, this technology generally involves feeding a thermoplastic polymer in the form of a continuous filament into a heated nozzle, where the thermoplastic filament becomes a viscous melt and can be therefore extruded. The 3-dimensional motion of the nozzle or the extruder assembly is precisely controlled by step motors and computer aided manufacturing (CAM) software. The first layer of the object is deposited on a build substrate, whereas additional layers are sequentially deposited and fused (or partially fused) to the previous layer by solidification due to a drop in temperature. The process continues until a 3-dimensional part is fully constructed. The process may also involve a temporary support material that provides support to the part being built and is subsequently removed from the finished part by mechanical means or dissolution in a suitable liquid medium. This process is commonly referred to as fused deposition modeling (FDM) or fused filament fabrication (FFF). This technology was first described by the teachings of U.S. Pat. No. 5,121,329.

U.S. Pat. No. 5,121,329 more specifically discloses an apparatus for making three-dimensional physical objects of a predetermined shape by sequentially depositing multiple layers of solidifying material on a base member in a desired pattern, comprising: a movable head having flow-passage means therein connected to a dispensing outlet at one end thereof, said outlet comprising a tip with a discharge orifice of predetermined size therein; a supply of material which solidifies at a predetermined temperature, and means for introducing said material in a fluid state into said flow-passage means; a base member disposed in close, working proximity to said dispensing outlet of said dispensing head; a mechanical means for moving said dispensing head and said base member relative to each other in three dimensions along "X," "Y," and "Z" axes in a rectangular coordinate system in a predetermined sequence and pattern and for displacing said dispensing head a predetermined incremental distance relative to the base member and thence relative to each successive layer deposited prior to the commencement of the formation of each successive layer to form multiple layers of said material of predetermined thickness which build up on each other sequentially as they solidify after discharge from said orifice; and a means for metering the discharge of said material in a fluid stream from said discharge orifice at a predetermined rate onto said base member to form a three-dimensional object as said dispensing head and base member are moved relative to each other. In one embodiment of the invention described in this patent, the material is in the form of a continuous flexible strand.

Material extrusion based AM (FDM or FFF) has become quite popular over the course of the past decade, largely due to the emergence of low-cost, desktop 3D printers. Such printers feature small sizes (similar to desktop inkjet printers) and are usually sold at a price of under $5,000 (United States dollars) per unit. Examples of material extrusion based desktop 3D printers are Replicator® series 3D printers from MakerBot Industries, H-series printers from Afinia, M-series printers from MakerGear LLC, etc. Some of those 3D printers are based on open-source hardware and are available as do-it-yourself kits.

There are several thermoplastic polymers that are currently being used in material extrusion based AM processes, such as FDM or FFF. Those materials include acrylonitril-butadiene-styrene (ABS), poly(lactic acid) (PLA), polycarbonate (PC), polystyrene (PS), high impact polystyrene (HIPS), polycaprolactone (PCL), and polyamide as well as some other polymeric materials. However the most commonly used materials are ABS and PLA.

ABS has the advantage of good overall mechanical properties; however it suffers from relatively large volumetric shrinkage and the generation of unpleasant odors. Furthermore, the generation of potentially toxic degradation products during printing makes ABS a less suitable option for desktop 3D printers because such printers generally do not have a heated build envelope and an effective mechanism to eliminate the odor and toxic degradation products. PLA, on the other hand, has less volumetric shrinkage which allows it to be printed properly even without a heated build envelope. It generates no unpleasant odor during printing, and the main degradation product is lactic acid which poses minimal health risk to 3D printer users. According to many surveys, PLA is increasingly becoming the most used material for desktop 3D printers. However, PLA still suffers from a number of drawbacks, including poor impact strength and a low softening temperature. The low softening temperature leads to difficulties with extrusion and printing quality.

A schematic of a typical printer head or extruder used on a FDM/FFF 3D printer is illustrated in FIG. 1. During conventional use a filament 1 with an average diameter of $d_F$ is moved by two counter-rotating feed rollers 2, subsequently into a filament barrel 3 with an inner diameter of $d_I$ and a heater block 4. To function properly, the filament should remain solid in the filament barrel and only becomes a viscous melt in or close to the heater block section. The solid part of filament 1 in the filament barrel 3 functions as a plunger that pushes the melt out of the nozzle 5. The nozzle orifice usually has a diameter in the range of 0.2 mm to 0.5 mm, more typically has an orifice diameter which is within the range of 0.3 mm to 0.4 mm.

As mentioned earlier, in FDM/FFF processes a temporary support material is required in some cases to make a model of a desired shape. The function of the support material is to provide a temporary mechanical support for overhanging portions of the model that are not directly supported by the modeling material in lower layers of the model. In other words, the temporary support material provides a base onto which the molten modeling material can be applied. After the extrusion has been completed the temporary support material is then be removed to provide the model of the size and dimensions which are desired. Currently three different types of support materials are being used in FDM/FFF processes. These materials include (1) the modeling material, (2) a water-soluble material, and (3) a solvent soluble material.

In some cases, the modeling material used in making the body of the model can be utilized as the temporary support material. In other words, the temporary support material is the same polymeric composition as is used in making the body of the object being made. For instance, this may be the only choice for FDM/FFF 3D printers which are equipped with only one extruder or printing head. However removing the temporary support structure in such cases can be very challenging because the adhesion between the support structure and the model is often too strong. In any case, removing the temporary support structure requires extensive labor and can often lead to poor surface appearance and even mechanical damage to the part being made.

Water-soluble thermoplastic materials which can be used as the temporary support material are subsequently removed by dissolving then in water or water-based solutions. Poly (vinyl alcohol) is a good example of a water-soluble polymeric materials that can be used as a temporary support. Additional examples of water-soluble polymeric materials which can be used as a temporary supports are described in U.S. Pat. No. 7,754,807 B2. These polymers contain carboxylic acid groups and are soluble in alkaline solutions. However, a significant drawback associated with utilizing of this class of temporary support materials is the difficulty to preserve them because they typically absorb large amounts of moisture from the atmosphere. The absorbed water can then change the physical dimension of the material (usually used in a filament form) as well as its thermal and rheological properties which can lead to printing problems, such as incorrect feeding and even printer jam. Accordingly, support materials in this class often have relatively short shelf lives and need to be used quickly once the material is opened from the packaging and exposed to the air.

Thermoplastic materials which are soluble in organic solvents can be used as the temporary support material and can be removed from the part being made by dissolving them in an organic solvent. The solvent is chosen so that only the support material is dissolved without dissolving the modeling material. In other words, the temporary support material should be soluble in the solvent chosen, but the modeling material should not be soluble in the solvent. One example of solvent-soluble support materials is high impact polystyrene (HIPS) which can be removed with limonene as the organic solvent. This approach however has several drawbacks. First, relatively large amounts of organic solvents are typically required to remove the support structure, leading to added cost and handling difficulties. Some organic solvents which can potentially be used are flammable, toxic to humans and animals, and/or have an adverse effect on the environment. Finally, the solvent waste (with support material dissolved in it) may require special disposal, which further leads to added cost, complexity, and environmental impact.

There is currently a need for a better temporary support material for FDM/FFF processes. It is important for such a material to provide adequately support the overhanging portions of the part being manufactured. It should be capable of being easily removed without damaging the part or part surfaces in contact with the support structure. Removal of the support structure should not require extensive labor or the use of undesirable organic or aqueous solutions. The temporary support material should also offer a reasonably long shelf life. Finally, these objectives should be realized without compromising the quality of the ultimate product, reducing the speed of printing, increasing cost, or increasing the complexity of the printer.

SUMMARY OF THE INVENTION

This invention provides a polymeric composition which offer an array of properties which make it highly desirable of use as a temporary support material in three-dimensional printing. The support material of this invention can be used to generate support structures that can be easily removed by simple mechanical means. In other words, removal of the temporary support material can be done in a reasonably short amount of time and accordingly takes less labor. It can be utilized advantageously in manufacturing most 3D printed parts and can be used in most conventional FDM/FFF 3D printers. The material does not absorb any tangible amount of water (i.e. less than 1 weight percent and preferably less than 0.5 weight percent) and accordingly offers a long shelf-life before being used. It does not rely upon any potentially dangerous, odorous, toxic, or flammable organic liquid or aqueous solvents. Finally, the polymeric composition of this invention can be used in the additive manufacturing of three dimensional articles without compromising the quality of the ultimate product, reducing printing speed, increasing cost, increasing the incidence of printer jamming, or requiring printers of increased complexity.

This invention more specifically discloses a polymeric composition which is particularly useful as a temporary support material for utilization in three-dimensional printing, said polymeric composition being comprised of a first polymeric component which is suitable for use as a modeling material and a second polymeric component which is immiscible with the first polymeric component, wherein the polymeric composition has a continuous phase which is comprised of the second polymeric component, and wherein the polymeric composition has a Shore A hardness of at least 80. In most cases the polymeric composition will also have a discontinuous phase which is comprised of the first polymeric component. However, it is possible for the polymeric composition to be of a co-continuous morphology wherein both the first polymeric component and the second polymeric component are present in a continuous phase.

The present invention explicitly reveals a polymeric composition which is particularly useful as a temporary support material for utilization in three-dimensional printing, said polymeric composition being comprised of a first polymeric component which is suitable for use as a modeling material and a second polymeric component which is immiscible with the first polymeric component, wherein the polymeric composition has a continuous phase and a discontinuous phase, wherein the continuous phase is comprised of the second polymeric component, wherein the discontinuous phase is comprised of the first polymeric component, and wherein the polymeric composition has a Shore A hardness of at least 80.

The subject invention further reveals a filament for use in three-dimensional printing as a temporary support material, said filament having a diameter which is within the range of 1.65 mm to 1.85 mm, wherein said filament is comprised of a polymeric composition comprising a first polymeric component which is suitable for use as a modeling material and a second polymeric component which is immiscible with the first polymeric component, wherein the polymeric composition has a continuous phase, wherein the continuous phase is comprised of the second polymeric component, and wherein the polymeric composition has a Shore A hardness of at least 80. In most cases the polymeric composition will also include a discontinuous phase which is comprised of the first polymeric component.

The present invention also discloses a filament for use in three-dimensional printing as a temporary support material, said filament having a diameter which is within the range of 2.75 mm to 3.15 mm, wherein said filament is comprised of a polymeric composition comprising a first polymeric component which is suitable for use as a modeling material and a second polymeric component which is immiscible with the first polymeric component, wherein the polymeric composition has a continuous phase, wherein the continuous phase is comprised of the second polymeric component, and wherein the polymeric composition has a Shore A hardness of at least 80. In most cases the polymeric composition will also include a discontinuous phase which is comprised of the first polymeric component.

The subject invention further reveals in the process of manufacturing a three-dimensional article by additive manufacturing which includes extruding at least one filament of a modeling material and at least one filament of a temporary support material into a desired geometric shape, the improvement which comprises the temporary support material being a polymeric composition which includes a first polymeric component which is suitable for use as the modeling material and a second polymeric component which is immiscible with the first polymeric component, wherein the polymeric composition has a continuous phase, wherein the continuous phase is comprised of the second polymeric component, and wherein the polymeric composition has a Shore A hardness of at least 80. In most cases the polymeric composition will also include a discontinuous phase which is comprised of the first polymeric component.

DETAILED DESCRIPTION OF THE INVENTION

The new temporary support material utilizes an immiscible polymer blend that is composed of at least two polymeric components. The first polymeric component ("component A") has good adhesion with the modeling material, and is preferred to be the modeling material itself. The second polymeric component ("component B") exhibits poor adhesion with the modeling material, and is immiscible with the component A. It is also preferred that the component A forms the minor phase (i.e. discontinuous phase rather than the continuous phase) in the polymer blend.

In the temporary support material of this invention the first polymeric component is normally present at a level which is within the range of about 10 weight percent to about 45 weight percent with the second polymeric component being present in the polymeric composition at a level which is within the range of about 55 weight percent to about 90 weight percent. In such polymeric compositions the first polymeric component will typically be present at a level which is within the range of about 15 weight percent to about 40 weight percent with the second polymeric component being present at a level which is within the range of about 60 weight percent to about 85 weight percent. It is frequently preferable for the first polymeric component to be present in the polymeric composition at a level which is within the range of about 20 weight percent to about 30 weight percent and for the second polymeric component to be present in the polymeric composition at a level which is within the range of about 70 weight percent to about 80 weight percent.

In order to provide adequate support to the part being built, the support material is required to have reasonable stiffness. The Shore A hardness of the support material should be no less than 80, typically at least 85, more typically at least 90, and preferably at least 95 (Shore A) or higher.

The support material also needs to have enough adhesion to the modeling material to allow for that the latter can be printed reliably on the support structure generated by the support material. However the adhesion should not be too strong as to render removal of the support difficult. The importance of adhesion is further illustrated in FIGS. 2-4.

Figure 1:
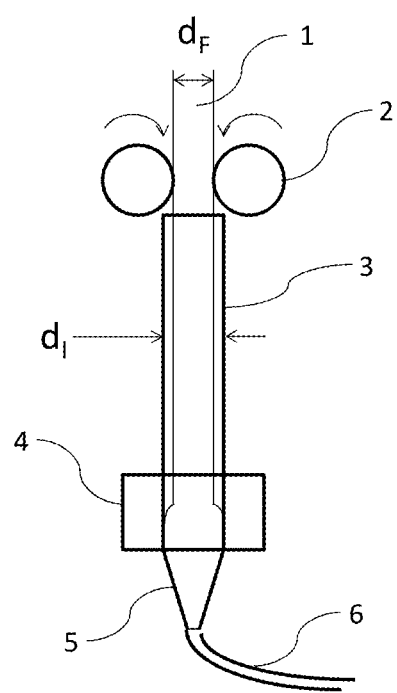
FIG. 1 is an illustration showing a typical printer head or extruder as is used in additive manufacturing printers.
Figure 2:
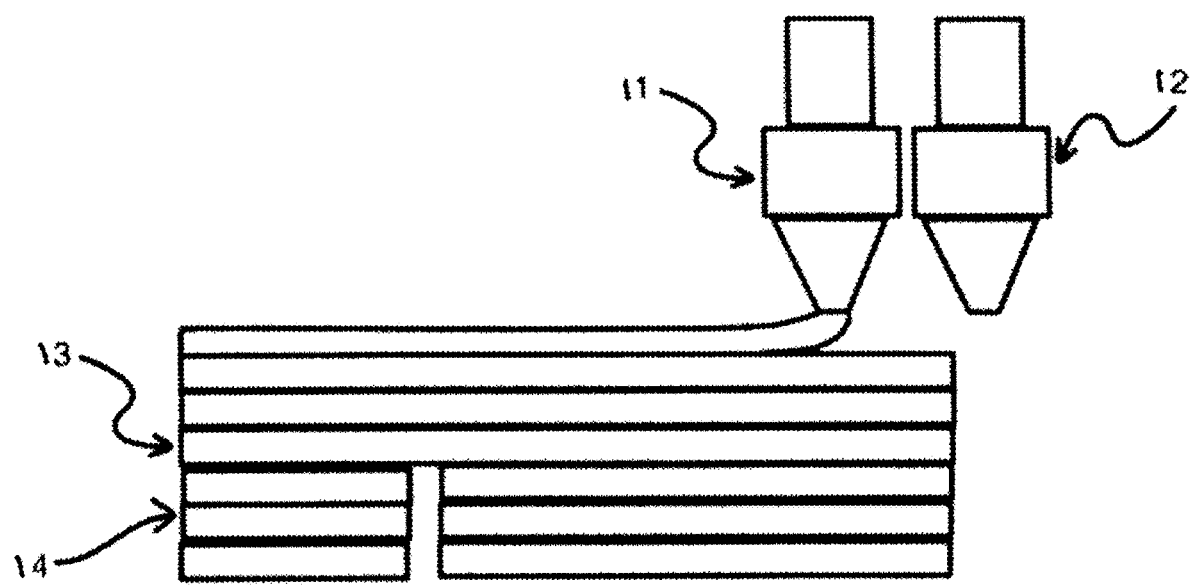
FIG. 2 is a schematic illustration showing the manner in which printing heads can extrude a modeling material onto a support material in making a desired part.
Figure 3:
FIG. 3 is an illustration showing a support/model interface, a model/model interface, and a support/support interface between respective layers of material used in manufacturing a desired part.
Figure 3:
Figure 3:

As is illustrated in FIG. 2, printing head 11 extrudes modeling material 13 and extruder head 12 extrudes support material 14. As can be seen in FIG. 3, the model material 13 can be extruded onto the support material 14 with a resulting support/model interface, model material 13 can be extruded onto model material 13 with a resulting model/model interface, support material 14 can be extruded onto support material 14 with a resulting support/support interface, or support material 14 can be extruded onto model material 13 with a resulting support/model interface.

Figure 4:
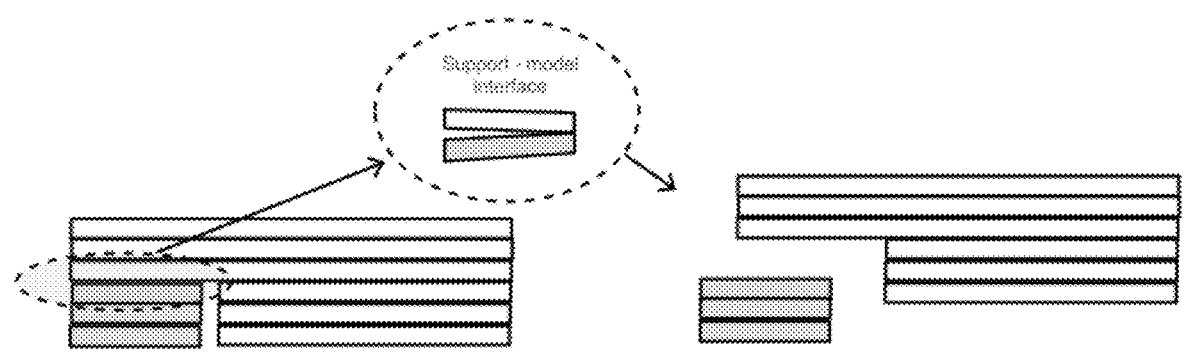
FIG. 4 is an illustration showing the removal of support material from model material at the interface between the support material and the model material.

When the support material is removed mechanically from the model material interfaces need to be considered: support-model interface, model-model interface, and support—support interface. The relative strength (or weakness) of the 3 types of interfaces as illustrated in FIG. 3 determine where the fracture occurs when trying to remove the support. In other words, the fracture can occur at the support-model interface, the model-model interface, or the support-support interface. When fracture occurs at the model-model interface, the printed part is damaged. When fracture occurs at the support-support interface, it would result in incomplete support removal, leaving residual support material on the model and compromising the surface appearance of the model. Therefore the ideal situation is that the fracture occurs at the support-model interface, as shown in FIG. 4. One of the key objectives of this invention is to provide a support material that, when used properly, always leads to fracture at the support-model interface. This requires the strength of the support-support interface and the model-model interface to be significantly stronger than the model-support interface.

This invention discloses a facile method to produce such support materials. The method involves the preparation of a polymer blend that is composed of at least two components, component A and B. The polymer blend needs to meet the following criteria:
1. Component A exhibits good adhesion to the modeling material, and is preferably the modeling material itself;
2. Component B exhibits poor adhesion to the modeling material
3. The blend has a phase separated morphology, whereas the continuous phase is composed of primarily component B.

In addition, the support material is preferably to exhibit reasonable stiffness, so that it can withstand the stresses during the 3D printing process. Our experience suggests that the hardness of the support material is preferred to be 95 (Shore A) or above.

The choices of components A and B are dependent on the modeling material used. Component A needs to have good adhesion to the modeling material used, and is preferred to be the modeling material itself. Examples of component A are: poly(lactic acid) (PLA), acrylonitrile-butadiene-styrene triblock polymers (ABS), polycarbonate (PC), polystyrene (PS), high impact polystyrene (HIPS), polycaprolactone (PCL), polyamide (PA) or Nylon, thermoplastic polyurethanes (TPUs), ethylene-vinyl acetate (EVA) copolymers, styrene-butadiene-styrene (SBS) and styrene-ethylene-butadiene-styrene (SEBS) copolymers, acrylic and acrylate polymers, methacrylic and methacrylate polymers, poly(methyl methacrylate) (PMMA), poly(butylene terephthalate) (PBT), poly(ethylene terephthalate) (PET), polyethylene (PE), poly(ethylene oxide) (PEO), poly(hydroxybutyrate), styrenic polymers, poly(norbornene), polyoctenamer, poly(pentenamer), polypropylene (PP), poly(propylene oxide) (PPO), polyurea, polyurethane urea, poly(vinyl acetate) (PVAc), poly(vinyl alcohol) (PVA or PVOH), poly(vinyl butyral) (PVB), poly(vinyl chloride) (PVC), poly(vinyl fluoride), starch-based polymers, styrene-acrylonitrile copolymers, styrene-methylmethacrylate copolymers, siloxane polymers, cellulose-based polymers. Preferably, component A is selected from commonly used modeling materials for FDM/FFF processes. Examples of commonly used modeling materials that can be used as component A are: poly(lactic acid) (PLA), acrylonitrile-butadiene-styrene (ABS), polycarbonate (PC), polystyrene (PS), high impact polystyrene (HIPS), polycaprolactone (PCL), polyamide (PA) or Nylon, thermoplastic polyurethanes (TPUs).

Poly(lactic acid), which is sometimes abbreviated as "PLA" is a highly preferred modeling material for use in conjunction with this invention. Poly(lactic acid) is a high molecular weight polyester which is synthesized by the polymerization of lactide monomer, which is a cyclic dimer of lactic acid, or 2-hydroxypropionic acid. Lactic acid is a chiral molecule with two enantiomeric forms, 1-lactic acid d-lactic acid. Typically 1-lactic acid and d-lactic acid are both present in PLA. The PLA for the current invention is preferred to have an 1-lactic acid content in the range of 85% to 100%. Examples of such PLA materials are 2500HP, 4032D, 2003D, 4043D and 7001D from NatureWorks LLC.

The selection of component B is based on what is used as component A. Examples of suitable polymers for component B include: poly(lactic acid) (PLA), acrylonitril-butadiene-styrene (ABS), polycarbonate (PC), polystyrene (PS), high impact polystyrene (HIPS), polycaprolactone (PCL), polyamide (PA) or Nylon, thermoplastic polyurethanes (TPUs), ethylene-vinyl acetate (EVA) copolymers, styrene-butadiene-styrene (SBS) and styrene-ethylene-butadiene-styrene (SEBS) copolymers, acrylic and acrylate polymers, methacrylic and methacrylate polymers, poly(methyl methacrylate) (PMMA), poly(butylene terephthalate) (PBT), poly(ethylene terephthalate) (PET), polyethylene (PE), poly(ethylene oxide) (PEO), poly(hydroxybutyrate), styrenic polymers, poly(norbornene), polyoctenamer, poly(pentenamer), polypropylene (PP), poly(propylene oxide) (PPO), polyurea, polyurethane urea, poly(vinyl acetate) (PVAc), poly(vinyl alcohol) (PVA or PVOH), poly(vinyl butyral) (PVB), poly(vinyl chloride) (PVC), poly(vinyl fluoride), starch-based polymers, styrene-acrylonitrile copolymers, styrene-methylmethacrylate cpolymers, siloxane polymers, cellulose-based polymers.

In addition to components A and B, the support material disclosed in this application can further contain other ingredients, such as, but not limited to: other polymers, colorants, pigments, fillers, fibers, plasticizers, nucleating agents, heat/UV stabilizers, process aids, impact modifiers, and other additives.

The blending of components A and B and other ingredients can be conducted using various polymer mixing/compounding techniques such as solvent mixing, melt mixing, continuous mixing, etc. It is preferred to conduct mixing using an extrusion process with a single- or twin-screw extruder.

In order to be used in FDM/FFF processes, the material is often processed into a filament form, as this is the preferred form that is used in most current FDM/FFF equipment. The most commonly used process to convert the material into a filament form is melt extrusion. In the melt extrusion process, various ingredients, either pre-compounded or individually added and dry-blended, are fed into a polymer extruder (either single-screw or twin-screw) with a cylindrical die and continuously extruded. The extrudate is subsequently quenched/cooled and pulled by a puller to give the desired physical dimensions before being collected. The process can also include equipment such as melt or gear pumps (to ensure a stable output), laser micrometers (on-line measurement of the physical dimensions), etc. The filament is preferred to have a uniform diameter with a circular cross section. The filament can be manufactured into almost any diameter. However the most commonly used diameters for 3D printing are about 1.75 mm and 3 mm with filaments having a diameter which is within the range of 2.75 mm to 3.15 mm also being frequently used. In any case, it is important for the diameter to have a small variation, as large variations in diameter can lead to poor printing quality and feeding problems. It is preferred for the filament to have a variation of less than ±0.1 mm.

The filament should be reasonably straight in order to feed properly into the printing head. As straightness or kinkiness is difficult to define, here we use a practical testing method to verify the straightness. The method involves passing the filament through a ring gauge with an internal diameter of $d_F+0.15$ mm ($d_F$ being the average filament diameter) and a thickness of 8.5 mm at a speed of about 50 mm/min. If the filament has large kinks, it will not be able to pass the ring gauge. The test can be used as a quality assurance step for the filament.

The disclosed support material can be used as a dedicated support material on dual-extruder FDM/FFF printers. It can also be used as for single-screw FDM/FFF printers. In the latter case, the support material is used for both the printed part as well as support.

This invention is illustrated by the following examples that are merely for the purpose of illustration and are not to be regarded as limiting the scope of the invention or the manner in which it can be practiced. Unless specifically indicated otherwise, parts and percentages are given by weight.

Example 1

A poly(lactic acid) (PLA) (4043D from NatureWorks, LLC) and a thermoplastic polyurethane (TPU) (Estane TPU S375D from Lubrizol) in the mass ratio of PLA:TPU=25:75 were fed into a 20 mm single-screw extruder with a cylindrical die with a diameter of 3 mm to manufacture a filament with a targeted diameter of 1.75 mm. The processing conditions are as follows:

| 1 (feed zone) | 2 (compression zone) | 3 (metering zone) | 4 (die) | Screw (rpm) |
|---|---|---|---|---|
| 120° C. | 190° C. | 215° C. | 190° C. | 30 |

The manufactured filament exhibits an average diameter of 1.75 mm with <±0.05 mm in variation. The TPU has a phase-separated morphology, with TPU and PLA forming the continuous matrix and dispersed phase, respectively.

The produced material was heated and sandwiched between a glass slide and a cover slip for observation by optical microscopy. The micrograph showed that PLA forms spherical particles, with diameters ranging from several microns to 20 microns, evenly dispersed in a continuous matrix of TPU.

Example 2

The manufactured filament as described in Example 1 was loaded onto a dual-extruder desktop FDM/FFF 3D printer (Replicator 2× from MakerBot Industries, LLC). Several models with large overhang portions were used to test the support performance as well as the ease of support removal. The basic printing conditions are as follows:

Modeling material: PolyPlus™ PLA (manufactured by JF Polymers (Suzhou) Co. Ltd.), printed at 195° C.
Support material: printed at 220° C.
Build plate temperature: 60° C.

The printing speed used was 90 mm/s. For all models tested, the support structure was adequate in supporting the overhang portions, and can be afterwards removed with simple pulling and tearing actions. In most cases the support can be removed by hand or with simple tools such as tweezers. No residue support material is visible on the printed model, meaning that the fracture always occurs at the support-model interface, as designed. In average it takes 1-2 minutes to remove all the support structure for the tested models.

Example 3

The manufactured filament as described in Example 1 was loaded onto a single-extruder desktop FDM/FFF 3D printer (Up! Plus 2nd Generation from Beijing Tier Times Technology Co., Ltd.). In this case the material is used both as the modeling material as well as the support material. It was found that, once a relatively large model infill density (>50%) is used, the support can be removed easily without breaking the model.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A filament for use in three-dimensional printing as a temporary support material, said filament having a diameter which is within the range of 1.65 mm to 1.85 mm or which is within the range of 2.75 mm to 3.15 mm, wherein said filament is characterized by being comprised of a polymeric composition which is comprised of a first polymeric component which is suitable for use as a modeling material and a second polymeric component which is immiscible with the first polymeric component, wherein the polymeric composition has a continuous phase and a discontinuous phase, wherein the continuous phase is comprised of the second polymeric component, wherein the discontinuous phase is comprised of the first polymeric component, wherein the first polymeric component is present in the polymeric composition at a level of up to 40 percent, and wherein the polymeric composition has a Shore A hardness of at least 80.

2. The filament as specified in claim 1 wherein said filament has a diameter which is within the range of 1.65 mm to 1.85 mm.

3. The filament as specified in claim 1 wherein said filament has a diameter which is within the range of 1.70 mm to 1.80 mm.

4. The filament as specified in claim 3 which is characterized in that said filament has a diameter which is within the range of 2.75 mm to 3.15 mm.

5. The filament as specified in claim 3 which is characterized in that said filament has a diameter which is within the range of 2.80 mm to 3.05 mm.

6. The filament as specified in claim 1 wherein the first polymeric component is selected from the group consisting of poly(lactic acid), acrylonitrile-butadiene-styrene triblock polymers, polycarbonate, polystyrene, high impact polystyrene, polycaprolactone, polyamides, thermoplastic polyurethanes, ethylene-vinyl acetate copolymers, styrene-butadiene-styrene triblock polymers, styrene-ethylene-butadiene-styrene copolymers, acrylic polymers, acrylate polymers, methacrylic polymers, methacrylate polymers, poly(methyl methacrylate), poly(butylene terephthalate), poly(ethylene terephthalate), polyethylene, poly(ethylene oxide), poly(hydroxybutyrate), styrenic polymers, poly(norbornene), poly-octenamer, poly(pentenamer), polypropylene, poly(propylene oxide), polyurea, polyurethane urea, poly(vinyl acetate), poly(vinyl alcohol), poly(vinyl butyral), poly(vinyl chloride), poly(vinyl fluoride), starch-based polymers, styrene-acrylonitrile copolymers, styrene-methylmethacrylate copolymers, siloxane polymers, and cellulose-based polymers.

7. The filament as specified in claim 6 wherein the second polymeric component is selected from the group consisting of poly(lactic acid), acrylonitrile-butadiene-styrene triblock polymers, polycarbonate, polystyrene, high impact polystyrene, polycaprolactone, polyamides, thermoplastic polyurethanes, ethylene-vinyl acetate copolymers, styrene-butadiene-styrene triblock polymers, styrene-ethylene-butadiene-styrene copolymers, acrylic polymers, acrylate polymers, methacrylic polymers, methacrylate polymers, poly(methyl methacrylate), poly(butylene terephthalate), poly(ethylene terephthalate), polyethylene, poly(ethylene oxide), poly(hydroxybutyrate), styrenic polymers, poly(norbornene), poly-octenamer, poly(pentenamer), polypropylene, poly(propylene oxide), polyurea, polyurethane urea, poly(vinyl acetate), poly(vinyl alcohol, poly(vinyl butyral) poly(vinyl chloride), poly(vinyl fluoride), starch-based polymers, styrene-acrylonitrile copolymers, styrene-methylmethacrylate copolymers, siloxane polymers, and cellulose-based polymers.

8. The filament as specified in claim 1 wherein the polymeric composition is not capable of absorbing more than 1 weight percent water.

9. The filament as specified in claim 1 wherein the first polymeric component is present in the polymeric composition at a level which is within the range of about 10 weight percent to 40 weight percent and wherein the second polymeric component is present in the polymeric composition at a level which is within the range of 60 weight percent to about 90 weight percent.

10. The filament as specified in claim 1 wherein the first polymeric component is present in the polymeric composition at a level which is within the range of about 15 weight percent to 40 weight percent and wherein the second polymeric component is present in the polymeric composition at a level which is within the range of about 60 weight percent to about 85 weight percent.

11. The filament as specified in claim 1 wherein the first polymeric component is present in the polymeric composition at a level which is within the range of about 20 weight percent to about 30 weight percent and wherein the second polymeric component is present in the polymeric composition at a level which is within the range of about 70 weight percent to about 80 weight percent.

12. The filament as specified in claim 1 wherein the polymeric composition not capable of absorbing more than 0.5 weight percent water.

13. The filament as specified in claim 1 wherein the polymeric composition has a Shore A hardness of at least 90.

14. The filament as specified in claim 1 wherein the polymeric composition has a Shore A hardness of at least 95.

15. The filament as specified in claim 1 wherein the first polymeric component is poly(lactic acid).

16. The filament as specified in claim 15 wherein the poly(lactic acid) has an l-lactic acid content which is within the range of 85% to 100%.

17. The filament as specified in claim 11 wherein the second polymeric composition is a thermoplastic polyurethane.

18. In the process of manufacturing a three-dimensional article by additive manufacturing which includes (1) extruding at least one filament of a modeling material and at least one filament of a temporary support material into a desired geometric shape, and (2) removing the temporary support material for the geometric shape, the improvement which comprises removing the temporary support material from the geometric shape by a mechanical means, wherein the temporary support material is a polymeric composition which is comprised of a first polymeric component which is suitable for use as a modeling material and a second polymeric component which is immiscible with the first polymeric component, wherein the polymeric composition has a continuous phase, wherein the continuous phase is comprised of the second polymeric component, wherein the first polymeric component is present in the polymeric composition at a level of up to 40 percent, and wherein the polymeric composition has a Shore A hardness of at least 80.

19. The method of claim 1 wherein the first polymeric component is poly(lactic acid) and wherein the second polymeric composition is a thermoplastic polyurethane.

20. In the process of manufacturing a three-dimensional article by additive manufacturing which includes (1) extruding at least one filament of a modeling material and at least one filament of a temporary support material into a desired geometric shape, and (2) removing the temporary support material for the geometric shape, the improvement which comprises removing the temporary support material from the geometric shape by a mechanical means, wherein the temporary support material is a polymeric composition which is comprised of a first polymeric component which is suitable for use as a modeling material and a second polymeric component which is immiscible with the first polymeric component, wherein the polymeric composition has a continuous phase and a discontinuous phase, wherein the continuous phase is comprised of the second polymeric component, wherein the discontinuous phase is comprised of the first polymeric component, and wherein the polymeric composition has a Shore A hardness of at least 80.

* * * * *